Patented Apr. 28, 1942

2,280,830

UNITED STATES PATENT OFFICE 2,280,830

COLLOIDAL DISPERSION

Joseph W. Johnson, Middleton, Mass., assignor to United Shoe Machinery Corporation, Flemington, N. J., a corporation of New Jersey No Drawing. Application September 28, 1940, Serial No. 358,941

14 Claims. (Cl. 252—308)

This invention relates to colloidal dispersions and to methods of preparing the same.

Objects of the present invention are to provide an advantageous method of reducing the interfacial tension between two phases of materials forming colloidal dispersions and to produce emulsions and other colloidal dispersions of improved and advantageous characteristics.

According to the present invention the above and other objects are attained by the joint use as interface modifying agents of certain amides and esters which may be broadly defined respectively as alkanol higher aliphatic acid amides and higher aliphatic esters of alkanolamine hydrochlorides.

By such conjoint use of the amide and ester the interfacial tension between the phases is lower than that produced by either the amide or the ester used alone. Moreover, extremely stable emulsions of the water-in-oil type may be prepared, a result hitherto difficult if not impossible of attainment.

The present invention is applicable not only to emulsions but also to other types of colloidal dispersions, such as the dispersion of solids in liquids. The invention has been found especially advantageous with respect to certain emulsions of the water-in-oil type containing high percentages of the dispersed phase. An example is the preparation of emulsions containing approximately 75% of water and 25% of a chlorinated hydrocarbon wherein the water is dispersed in the chlorinated hydrocarbon but wherein nevertheless the emulsion still retains a high degree of fluidity.

The efficiency of emulsification as accomplished in the practice of this invention is evidenced in part by the ease with which emulsions may be formed. Thus, for example, with a gallon of materials (see Example I infra) to form an emulsion and in the presence of an amide and an ester according to this invention, the mixture was stirred for 5 seconds with a motorized egg beater. This was sufficient to produce an emulsion which retained its stability in storage for a number of months. Other instances have occurred wherein mixtures of materials according to this invention have emulsified merely upon standing.

The practice of the invention results, furthermore, in the production of dispersions wherein the particles of the dispersed phase are of very small size with all the advantages consequent thereupon, including the preparation of emulsions capable of penetrating various materials without the breaking of the emulsion, the preparation of dispersions with a high degree of effectiveness and efficiency either in the coating or impregnation of materials, and with the further advantage of contributing to the stability of the emulsion or other dispersion.

In certain instances I have found that the greatest interfacial tension lowering effect has been produced by the use of equimolar proportions of the amide and ester. However, the range of proportions of the amide and ester permissible within the scope of this invention is wide and includes a range of from about 10 mol % of amide and 90 mol % of ester to about 90 mol % of amide and 10 mol % of ester. For certain purposes in oil-in-water emulsions or in water-in-oil emulsions I have found it desirable to use mixtures of amides and esters in the range of 33 mol % of amide and 67 mol % of ester to 67 mol % of amide and 33 mol % of ester. Generally speaking, for water-in-oil emulsions, it is desirable that the mixture of amide and ester contain not less than 50 mol % of amide. In the case of oil-in-water emulsions, on the other hand, it is desirable that the mixture of amide and ester contain not less than 50 mol % of ester.

The total of the amide and ester in any given case may be from about ¼% to 5% by weight of the entire dispersion. Ordinarily, however, 1% is sufficient.

Chemically, amides suitable for the practice of the present invention broadly may be defined, as hereinabove stated, as alkanol higher aliphatic acid amides. The acids from which such amides may be derived, more specifically may be referred to as aliphatic monocarboxylic acids containing from 10 to 22 carbon atoms. Examples of such acids are stearic, oleic, linoleic, linolenic and ricinoleic acids which respectively are examples of saturated aliphatic acids, unsaturated aliphatic acids with one double bond, unsaturated aliphatic acids with two double bonds, unsaturated aliphatic acids with three double bonds, and hydroxy aliphatic acids. The alkanolamines from which the amides are derived may be mono- or di-substituted with ethanol, propanol or butanol groups, for example, monoethanolamine, diethanolamine, propanolamines and butanolamines. A specific example of a preferred amide coming within the scope of this invention is monoethanol oleic acid amide.

While amides according to this invention may be prepared in any of several suitable ways well known to the art, an illustrative method of preparation will be described in connection with the monoethanol oleic acid amide, namely, $$C_{17}H_{33}CONHCH_2CH_2OH$$

To prepare this substance equimolar quantities of oleic acid and monoethanolamine are heated at a moderate temperature, for example, in the neighborhood of 50° C. for a period of about an hour, during which period the mixture is stirred. This reaction, which is that of saponification, is exothermic and results in the production of monoethanolamine oleate soap. This reaction may be represented by the following equation:

$$C_{17}H_{33}COOH + NH_2CH_2CH_2OH \rightarrow C_{17}H_{33}COONH_3CH_2CH_2OH$$

The monoethanolamine oleate is heated under a vacuum, preferably a high vacuum such as 2.3 cm., and the temperature is allowed to rise to at least 100° C. A condensation reaction takes place with the elimination of one molecule of water. This water is removed from the reaction mass by distillation. When the water ceases to come off the reaction is completed with the formation of monoethanol oleic acid amide. This reaction may be represented as follows:

$$C_{17}H_{33}COONH_3CH_2CH_2OH \xrightarrow{\text{heated in vacuum}} C_{17}H_{33}CONHCH_2CH_2OH + H_2O$$

The esters contemplated by the present invention broadly may be defined, as mentioned hereinabove, as higher aliphatic acid esters of alkanolamine hydrochlorides. The acids from which such esters may be derived are the same as those referred to hereinabove in connection with the amides. The alkanolamines from which the esters may be derived include not only the mono- and di-substituted amines but also those tri-substituted with ethanol, propanol or butanol groups. A specific example of a preferred ester coming within the scope of this invention is the oleic acid ester of monoethanolamine hydrochloride, namely, $C_{17}H_{33}COOCH_2CH_2NH_3Cl$. The formula of this material also may be presented as $C_{17}H_{33}COOCH_2CH_2NH_2HCl$. The esters coming within the scope of the present invention and their mode of manufacture are described and claimed in my copending application, Serial No. 358,940, filed September 28, 1940.

As has been suggested hereinbefore in connection with the ease of forming emulsions, in general a very small amount of mechanical work is necessary to form emulsions and other dispersions with mixtures of ester and amide according to this invention. Indeed, in some cases emulsification takes place spontaneously. This is due to the rapidly developed extremely low interfacial tension produced by the mixture of amide and ester. The extremely low interfacial tension resulting from the use of the amide and ester may be determined by the pendant drop method, such as described on pages 1001–1019 of the November 1938 issue (volume 42, No. 8) of "The Journal of Physical Chemistry" in an article entitled "Boundary tension by pendant drops," by J. M. Andreas, E. A. Hauser and W. B. Tucker. According to actual measurements made by the above method, the interfacial tension of an equimolar mixture of a monoethanol oleic acid amide and oleic acid ester of monothanolamine hydrochloride when measured in a mixed amyl chloride solution against water was less than 1 dyne per centimeter within less than 3 seconds after the formation of the drop, which is probably one of the lowest measurements ever made of rapidly developed interfacial tension. See Example I infra wherein the phases consist of mixed amyl chlorides and water respectively and wherein the emulsifying agent is a substantial equimolar mixture of the above-mentioned amide and ester.

The conjoint use of the amide and ester in the practice of this invention results in the preparation of emulsions wherein, in general, the dispersed particles are small and stable in dispersed condition. The advantageous results of the invention are particularly marked when the amide and ester are present in equimolar proportions but many of the advantages of the invention are obtained when the amide and ester are present within the ranges of about 10 to 90 mol % of amide and about 90 to 10% of ester.

As suggested hereinabove, either water-in-oil or oil-in-water emulsions may be prepared by the practice of the present invention. Generally speaking, in so preparing emulsions, the emulsifying material is dissolved in the phase in which it is soluble, which is usually the oil phase. Then the material which is to constitute the external phase of the emulsion is stirred or otherwise agitated, and during such stirring there is added thereto the material which is to constitute the internal phase.

The practice of the invention is illustrated by the following specific examples:

Example I

| | |
|---|---|
| Mixed amyl chlorides | cc 250 |
| Monoethanol oleic acid amide (molecular weight 325) | grams 5 |
| Oleic acid ester (molecular weight 361) of monoethanolamine hydrochloride | grams 5 |
| Water | cc 750 |
| Yield | cc 1000 |

The above composition was prepared by dissolving the amide and ester in the mixed amyl chlorides, stirring the resulting solution, and adding the water thereto while the amyl chloride solution was being stirred. The product was a water-in-oil emulsion wherein the 750 cc. of water was emulsified in 250 cc. mixed amyl chlorides. In spite of the large amount of water emulsified in the considerably smaller quantity of mixed amyl chlorides, the resulting emulsion was liquid in character and exhibited a viscosity similar to that of ordinary cow's milk.

The above emulsion has been used in tempering outsole leather and it has been found that said emulsion penetrates sole leather readily without breaking of the emulsion at the surface of the leather. The leather is rapidly penetrated uniformly and evenly and within a relatively short time the leather exhibits the properties of tempered or mulled leather. The exhibition by the leather of tempered or mulled characteristics takes place with the above emulsion in periods not greater than an hour and in many instances in a few minutes, as compared with the overnight period required when ordinary water is used for tempering purposes.

The above emulsion has exhibited great stability under storage conditions. Thus, samples of the emulsion have been stored for periods of upwards of a year without hydrolysis or breaking down of the emulsion.

Example II

| | | |
|---|---|---|
| Mixed amyl chlorides | cc__ | 200 |
| Diethyl phthalate | cc__ | 50 |
| Monoethanol oileic acid amide | grams__ | 5 |
| Oleic acid ester of monoethanolamine hydrochloride | grams__ | 5 |
| Water | cc__ | 750 |
| Yield | cc__ | 1000 |

The above emulsion was prepared by dissolving the ester and amide in the mixed amyl chlorides and diethyl phthalate and adding water to the resulting solution during stirring of said solution. The resulting product was a water-in-oil emulsion of a consistency approximating that of milk which was useful for tempering leather and additionally imparting a permanent softness thereto.

Emulsions as above have been stored for periods of upwards of a year without exhibiting breaking of the emulsion or hydrolysis or other deterioration.

It should be noted that the compositions under Examples I and II could be prepared as oil-in-water emulsions by stirring or otherwise agitating the water and adding the amyl chloride solutions thereto. The amide and ester may be added in precisely the same manner as described above.

Example III

| | | |
|---|---|---|
| Neat's-foot oil | cc__ | 500 |
| Water | cc__ | 500 |
| Monoethanol oleic acid amide | grams__ | 5 |
| Oleic acid ester of monoethanolamine hydrochloride | grams__ | 10 |
| Yield | cc__ | 1000 |

The above emulsion was prepared by dissolving the ester and amide in the neat's-foot oil, stirring the water, and adding the neat's-foot oil solution thereto. The result was an oil-in-water emulsion which upon being diluted further with water was useful in fat liquoring leather. This emulsion has also exhibited the property of great stability on storage.

Example IV

| | | |
|---|---|---|
| Vinylite XYSG (polyvinyl butyral) | grams__ | 20 |
| Acetone | cc__ | 700 |
| Benzene | cc__ | 300 |
| Monoethanol oleic acid amide | grams__ | 2.5 |
| Oleic acid ester of monoethanolamine hydrochloride | grams__ | 5 |
| Water | cc__ | 1000 |
| Yield | cc__ | 2000 |

The above composition was prepared by dissolving the amide and ester and Vinylite in the acetone and benzene. The water was stirred and the acetone-benzene solution added thereto. The result was an oil-in-water emulsion which is useful in coating or impregnating wood flour, leather, cotton fiber, asbestos, etc.

The above composition is an example wherein the oil phase consists of liquid (acetone-benzene) containing dissolved or dispersed solid matter (Vinylite XYSG).

The above emulsion may be transformed into a dispersion of a solid (Vinylite XYSG) in water by removing the acetone and benzene from the above-described emulsion. This may be accomplished by distillation of the emulsion under a vacuum and employing a fractionating column.

Example V

| | | |
|---|---|---|
| Crepe rubber | grams__ | 20 |
| High test gasoline | cc__ | 350 |
| Monoethanol oleic acid amide | grams__ | 2.5 |
| Oleic acid ester of monoethanolamine hydrochloride | grams__ | 5 |
| Water | cc__ | 1650 |
| Yield | cc__ | 2000 |

The above composition was prepared by dissolving the rubber, the ester, and the amide in the gasoline and stirring the water, and adding the solution thereto. The resulting product is a stable oil-in-water type of emulsion wherein the rubber is present in the dispersed phase.

Example VI

| | | |
|---|---|---|
| Crepe rubber | grams__ | 20 |
| Monoethanol oleic acid amide | do____ | 7 |
| Oleic acid ester of monoethanolamine hydrochloride | grams__ | 7 |
| Water | cc__ | 1000 |
| Yield | cc__ | 1000 |

The above composition may be prepared by working the rubber on a rubber mill, incorporating an amide and ester therewith on the mill and adding a portion of the water to the rubber on the mill whereby there is formed a friable rubber mass. The balance of the water may then be stirred in a mixer and the rubber composition added thereto. The product is a dispersion of rubber in water.

In certain cases it may be desired to incorporate sulphur and other rubber compounding agents with the rubber while still on the mill in which case a vulcanizable dispersion would be prepared.

Example VII

| | | |
|---|---|---|
| Styrene | cc__ | 500 |
| Monoethanol oleic acid amide | grams__ | 5 |
| Oleic acid ester of monoethanolamine hydrochloride | grams__ | 10 |
| Water | cc__ | 500 |
| Yield | cc__ | 1000 |

A dispersion of polymerized styrene in water may be prepared by dissolving the amide and ester in monomeric styrene, stirring the water, and adding the styrene solution thereto whereby an oil-in-water emulsion results. This emulsion is heated under reflux for a period of hours and stirred. Polymerization of the styrene occurs with the production of a milky white dispersion of polymerized (solid) styrene in water.

It is to be understood from the specific examples that the invention is not limited to the preparation of emulsions but that other colloidal dispersions, for example, those of solids in liquids may be prepared. Indeed, the invention is useful for the preparation of dispersions of a wide variety of constituents.

In the above specific examples the amide within the scope of the invention has been monoethanol oleic acid amide and the ester has been oleic acid ester of monoethanolamine hydrochloride. It will be understood that any of the amides and esters within the scope of the invention similarly may be utilized. Moreover, the amides and esters used together need not be prepared from the same acids and amines. Furthermore, as pointed out in detail hereinabove, the ratio of amide to ester may vary widely, in some cases from 10 mol % of amide to 90 mol % of ester to 90 mol % of amide and 10 mol % of ester, while still retaining many of the benefits of the invention.

In carrying out the present invention mixtures of ingredients may be employed rather than the pure compounds. Thus, mixtures of amines as well as mixtures of acids may be employed in preparing the amides and esters. Furthermore, the acids may be obtained from natural, animal and vegetable oils. Oils, the hydrolysis of which result in mixtures of acids suitable for carrying out the present invention, include the following: castor oil, coconut oil, cod liver oil, corn oil, cottonseed oil, hemp seed oil, lard oil, linseed oil, menhaden oil, neat's-foot oil, olive oil, palm oil, rape seed oil, soya bean oil, sunflower seed oil, and tung oil.

Having described my invention, what I claim as new and desire to secure by Letters Patent of the United States is:

1. The method of reducing the interfacial tension between two phases of materials forming a dispersion which comprises associating with said materials an alkanol higher aliphatic acid amide, and a higher aliphatic aicd ester of alkanolamine hydrochloride, said amide and ester being present in the ratio of from 10 to 90 mol % of the amide to 90 to 10 mol % of the ester.

2. The method of reducing the interfacial tension between two phases of materials forming a dispersion which comprises associating with said materials an alkanol amide of an aliphatic monocarboxylic acid containing from 10 to 22 carbon atoms, and a higher aliphatic acid ester of alkanolamine hydrochloride wherein each ester group present is from an aliphatic monocarboxylic acid containing from 10 to 22 carbon atoms, said amide and ester being present in the ratio of from 10 to 90 mol % of the amide to 90 to 10 mol % of the ester, the total of the ester and amide being from ¼ to 1% by weight of the entire dispersion.

3. The method of reducing the interfacial tension between two phases of materials forming a dispersion which comprises associating with said materials an alkanol amide of an aliphatic monocarboxylic acid containing from 10 to 22 carbon atoms, said amide being from a group consisting of ethanol, propanol and butanol amides, and a higher aliphatic monoacid ester of alkanolamine hydrochloride of the class consisting of ethanolamine, propanolamine and butanolamine hydrochlorides in which each ester group present is from an aliphatic monocarboxylic acid containing from 10 to 22 carbon atoms, said amide and ester being present in the ratio of from 10 to 90 mol % of the amide to 90 to 10 mol % of the ester.

4. The method of reducing the interfacial tension between two phases of materials forming a dispersion which comprises associating with said materials an alkanol amide of an aliphatic monocarboxylic acid containing from 10 to 22 carbon atoms, and an acid ester of ethanolamine hydrochloride wherein each ester group present is from a monocarboxylic acid containing from 10 to 22 carbon atoms, said amide and ester being present in the ratio of from 10 to 90 mol % of the amide to 90 to 10 mol % of the ester.

5. The method of reducing the interfacial tension between two phases of materials forming a dispersion which comprises associating with said materials an ethanol amide of oleic acid and an oleic acid ester of an ethanolamine hydrochloride, said amide and ester being present in the ratio of from 10 to 90 mol % of the amide to 90 to 10 mol % of the ester, the total of said ester and amide present being from ¼ to 1% by weight of the entire dispersion.

6. The method of reducing the interfacial tension between two phases of materials forming a dispersion which comprises associating with said materials monoethanol oleic acid amide and the oleic acid ester of monoethanolamine hydrochloride, said amide and ester being present in the ratio of from 10 to 90 mol % of the amide to 90 to 10 mol % of the ester, the total of said ester and amide present being from ¼ to 1% by weight of the entire dispersion.

7. A dispersion characterized by the presence of interface modifying material comprising an alkanol higher aliphatic acid amide, and a higher aliphatic acid ester of alkanolamine hydrochloride, said amide and ester being present in the ratio of from 10 to 90 mol % of the amide to 90 to 10 mol % of the ester.

8. A dispersion characterized by the presence of interface modifying material comprising an alkanol amide of an aliphatic monocarboxylic acid containing from 10 to 22 carbon atoms, and a higher aliphatic acid ester of ethanolamine hydrochloride wherein each ester group present is from an aliphatic monocarboxylic acid containing from 10 to 22 carbon atoms, said amide and ester being present in the ratio of from 10 to 90 mol % of the amide to 90 to 10 mol % of the ester, the total of the ester and amide being from ¼ to 1% by weight of the entire dispersion.

9. A dispersion characterized by the presence of interface modifying material comprising an alkanol amide of an aliphatic monocarboxylic acid containing from 10 to 22 carbon atoms, said amide being from a group consisting of ethanol, propanol and butanol amides, and a higher aliphatic monoacid ester of alkanolamine hydrochloride of the class consisting of ethanolamine, propanolamine and butanolamine hydrochlorides in which each ester group present is from an aliphatic monocarboxylic acid containing from 10 to 22 carbon atoms, said amide and ester being present in the ratio of from 10 to 90 mol % of the amide 90 to 10 mol % of the ester.

10. A dispersion characterized by the presence of interface modifying material comprising an ethanol amide of an aliphatic monocarboxylic acid containing from 10 to 22 carbon atoms, and an acid ester of ethanolamine hydrochloride wherein each ester group present is from a monocarboxylic acid containing from 10 to 22 carbon atoms, said amide and ester being present in the ratio of from 10 to 90 mol % of the amide to 90 to 10 mol % of the ester.

11. An emulsion characterized by the presence of interface modifying material comprising an ethanol amide of an aliphatic monocarboxylic acid containing from 10 to 22 carbon atoms, and an acid ester of ethanolamine hydrochloride wherein each ester group present is from a monocarboxylic acid containing from 10 to 22 carbon atoms, said amide and ester being present in the ratio of from 10 to 90 mol % of the amide to 90 to 10 mol % of the ester, the total of the amide and ester present being from ¼ to 1% by weight of the entire emulsion.

12. A dispersion characterized by the presence of interface modifying material comprising an ethanol amide of oleic acid, and an oleic acid ester of an ethanolamine hydrochloride, said amide and ester being present in the ratio of from 10 to 90 mol % of the amide to 90 to 10 mol % of the ester, the total of the amide and ester present being from ¼ to 1% by weight of the entire dispersion.

13. A dispersion characterized by the presence of interface modifying material comprising monoethanol oleic acid amide and the oleic acid ester of monoethanolamine hydrochloride, said amide and ester being present in the ratio of from 10 to 90 mol % of the amide to 90 to 10 mol % of the ester, the total of the amide and ester present being from ¼ to 1% by weight of the entire dispersion.

14. An emulsion of water in mixed amyl chlorides characterized by the presence of interface modifying material comprising monoethanol oleic acid amide and the oleic acid ester of monoethanolamine hydrochloride in equimolar quantities.

JOSEPH W. JOHNSON.